June 27, 1939.     M. E. HUBBARD     2,164,243
LIQUID LEVEL GAUGE
Filed June 30, 1936     2 Sheets-Sheet 1
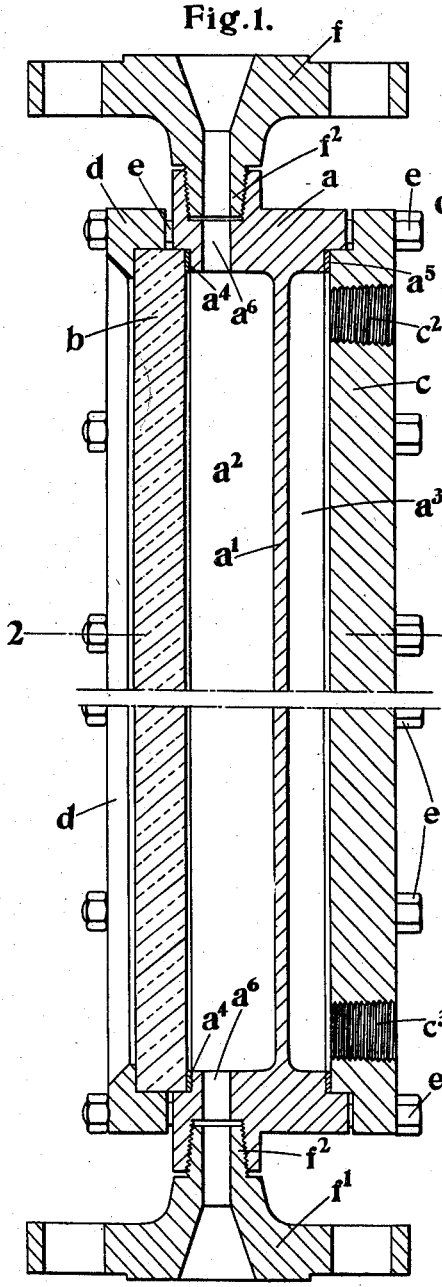
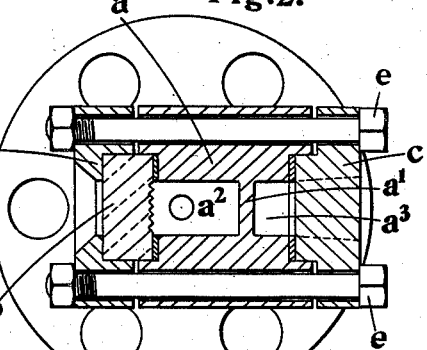
Fig.1.
Fig.2.
Fig.3.
Inventor
*M. E. Hubbard*
by
*W. E. Evans,*
Attorney.

June 27, 1939.  M. E. HUBBARD  2,164,243
LIQUID LEVEL GAUGE
Filed June 30, 1936  2 Sheets-Sheet 2

Inventor
M. E. Hubbard:
by
W. E. Evans
Attorney.

Patented June 27, 1939

2,164,243

UNITED STATES PATENT OFFICE 2,164,243

LIQUID LEVEL GAUGE

Michael Edmund Hubbard, Paris, France

Application June 30, 1936, Serial No. 88,139
In Great Britain December 27, 1935

2 Claims. (Cl. 73—330)

This invention relates to liquid level gauges for use on tanks or containers for the storage of volatile liquids such as propane, butane or other such liquids of low boiling point.

Liquid level gauges externally applied upon tanks or containers used for the storage of such volatile liquids are impaired in their utility when the temperature of the gauge rises substantially above that of the liquid in the tank or container under the effect of atmospheric conditions, inasmuch as on rise of temperature partial vaporisation takes place of the liquid in the gauge column, with the consequence that the level of liquid in the gauge is no longer the same as that within the tank or container.

The invention has among its objects to provide simple and convenient means to ensure a visible indication by the gauge of the true level of liquid in the storage tank or container by restoring the conditions of temperature and vapour pressure within the gauge approximately to those within the storage tank or container whenever the level in the gauge appears unsteady or it is desired to test or determine the true level within the storage tank or container.

According to the invention therefore means are provided whereby the column of liquid in the gauge is cooled whenever by reason of its unsteadiness it is desired to test it in order to determine the true level of liquid in the storage tank or container. For the purpose the liquid level gauge is provided with a chamber or jacket in position adjacent or surrounding the liquid column and means provided whereby a fluid cooling medium may be admitted into the chamber or jacket whereby the temperature of the liquid in the column may be reduced, and thus the vaporisation of the liquid in the column may be arrested. The temperature or vapour pressure within the gauge will then fall to that or approximately to that within the storage tank or container. The actual level in the tank may thus in a simple way be determined by the admission of the cooling medium into the cooling chamber or jacket.

The cooling medium may for example be the volatile liquid that is stored in the tank or container, which will be vaporised by expansion on admission into the chamber or jacket adjacent to or surrounding the gauge glass. Air under pressure or any other fluid adapted to be cooled on expansion or any fluid such as water, the supply of which is available at a sufficiently low temperature for its effective use as the cooling medium may be employed.

The invention comprises the features which are hereinafter described.

The invention is illustrated by way of example in the accompanying drawings, in which:

Figure 1 is a vertical section of a liquid level gauge constructed according to the invention.

Figure 2 is a cross-section taken on the line 2—2 of Figure 2, and

Figure 3 is a side elevation on a smaller scale showing the liquid level gauge in position upon a storage tank or container for the storage of low boiling point liquids.

Figures 4, 5:
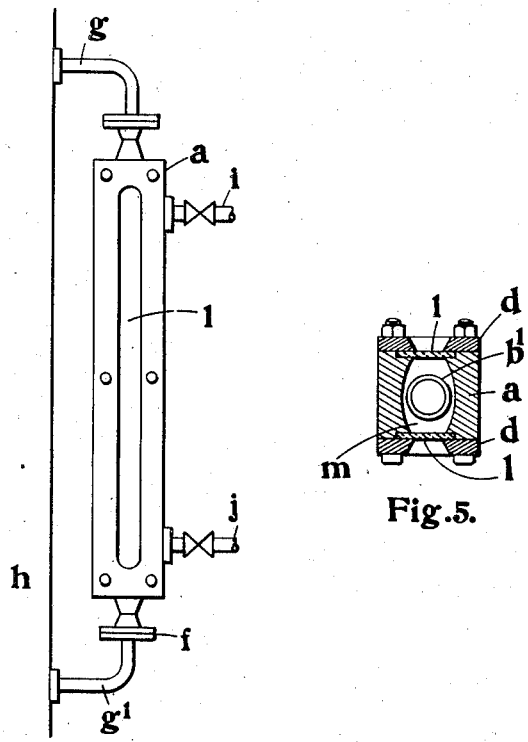
Figure 4 is a diagrammatic side elevation of a modification of level gauge suitable for use according to the invention and Figure 5 is a corresponding transverse cross-section.

In carrying the invention into effect as illustrated in the accompanying drawings in its application to a storage tank or container for the storage of liquids of low boiling point such as propane, butane or the like, the liquid level gauge is formed as a rectangular body $a$ of metal and of substantially H shape in transverse cross-section whereby parallel top and bottom walls and parallel lateral walls are provided with an integral vertical partition wall $a^1$ of small thickness extending between by which two vertical chambers $a^2$, $a^3$, are formed respectively at the front and the rear of the wall $a^1$. The respective chambers $a^2$, $a^3$, are closed respectively by a transparent front plate $b$ advantageously of glass, and by a rear plate $c$ of metal, the transparent front plate $b$ being conveniently held in position by means of a front metal frame $d$ upon a seat $a^4$ provided for its reception, while the rear plate $c$ is also applied upon a seat $a^5$ and the transparent front plate $b$ and the rear metal plate $c$ are held in position by means of a series of bolts $e$ passing through the top, bottom and lateral walls of the body $a$ and through the front frame $d$ and rear plate $c$, a layer of packing being advantageously applied on the seats $a^4$, $a^5$ to ensure a fluid tight joint.

At the upper and lower ends the body $a$ is provided with holes $a^6$ opening into the chamber $a^2$, and with internally screw-threaded sockets for the reception of the upper and lower flanged tubular fittings $f$, $f^1$, provided with corresponding screw-threaded ends $f^2$ adapted to enter the screw-threaded sockets. The flanged fittings $f$, $f^1$ are coupled to corresponding flanged fittings $f$, $f^1$ to which the piping $g$, $g^1$ is respectively secured through which communication with the chamber $a^2$ at its upper and lower ends is respectively made with the storage tank or container $h$ at corresponding positions under control of the valves $g^2$, whereby as the result of the free communication established through the piping $g$, $g^1$ the same level of the liquid column is maintained in the chamber $a^2$ as in the storage tank or container $h$.

Means are provided according to the invention whereby a determined small quantity of the volatile liquid within the storage tank or container $h$ may be admitted into and permitted to discharge from the chamber $a^3$ for which purpose tapered screw-threaded holes $c^2$, $c^3$ may be respectively provided at the upper and lower ends of the rear plate $c$ by which connection may be made of the inlet piping $c^4$ and outlet piping $c^5$ respectively, the piping $c^4$ being connected at its lower end to the piping $g^1$ and being provided with a control valve $c^6$ by which communication may be opened or closed with the storage tank or container $h$ at its lower part when it is desired to test or determine the level of liquid in the storage tank or container. Thus when the temperature of the liquid in the gauge column may have risen under the effect of atmospheric conditions with consequent partial vaporisation of the liquid in the column whereby the level is unsteady or unreadable, a quantity of volatile liquid from within the tank or container $h$ may on the opening of the control valve $c^6$ be admitted into the lower part of the expansion or cooling chamber $a^3$. The vapour or cooling fluid may pass from the outlet pipe $c^5$ into a receptacle for recovery or the vapour may be passed to the atmosphere.

It will be understood that owing to the reduction of pressure the liquid vaporises and cools the gauge sufficiently so that the level of liquid within the column in the chamber $a^2$ becomes steady in a short time, giving then a true indication of the level in the storage tank or container $h$. On the admission of the determined small quantity of the volatile liquid the valve $c^6$ is closed.

In Figures 4 and 5 a modification of liquid level gauge is illustrated in which a transparent gauge tube $b^1$ is surrounded by a cooling chamber or jacket $m$ to which a quantity of the volatile liquid that may be stored in a tank or container $h$ to which the liquid level indicator is applied may be admitted whenever the level in the gauge appears unsteady or it is desired to test the true level within the storage tank or container $h$.

The volatile liquid passes into the cooling chamber or jacket through the valve controlled inlet pipe $j$ and the vapour leaves by the valve controlled outlet pipe $i$. The liquid level within the gauge is visible through one or other of the lateral sighting glasses $l$.

It will furthermore be understood that where such storage tanks and the external liquid level gauges thereon are exposed for long periods to atmospheric conditions which favour the vaporisation of the liquid in the gauge column, means may be provided for a substantially continuous supply of cooling fluid such as cold water through the cooling chamber or jacket with slow leakage or discharge from the chamber or jacket, whereby a reliable observation of the level is always available.

I claim:

1. An external liquid level indicator applicable to a vessel for the storage of a liquid of low boiling point such as propane, butane or the like, and consisting of a body of constructional material in which two chambers are provided separated by a wall of small thickness, one of said chambers being closed by a transparent cover plate and serving for the liquid column of the indicator and the other chamber being closed by a cover plate to serve for a cooling agent, tubular connections between the upper and lower ends of the said body and the upper and lower ends of the said storage vessel for communication between the said storage vessel and the respective ends of the said chamber serving for the liquid column of the indicator and means at the lower and upper ends of the said body for the admission of the cooling agent into and discharge from the other chamber.

2. An external liquid level indicator exposed to atmospheric temperatures for indicating the liquid level in a vessel for the storage of a liquid of low boiling point, such as propane, butane or the like, said indicator comprising a body of constructional material having two parallel chambers separated by a relatively thin wall through which heat may be transferred from one chamber to the other, one of said chambers being closed by a transparent plate and serving to contain the liquid column of the indicator, tubular connections between the upper and lower ends of said latter chamber and said vessel, above and below the liquid level in the vessel, respectively, the other of said chambers serving as an expansion chamber, and means for admitting regulated quantities of liquid of low boiling point into said expansion chamber and for permitting the vapours formed in the last-mentioned chamber to exhaust therefrom, whereby the indicator body is cooled by the vaporization of the low boiling liquid admitted to the expansion chamber.

MICHAEL EDMUND HUBBARD.